May 10, 1927.
D. M. SIMONS
CABLE JOINT
Filed Jan. 3, 1925
1,628,438
2 Sheets-Sheet 1
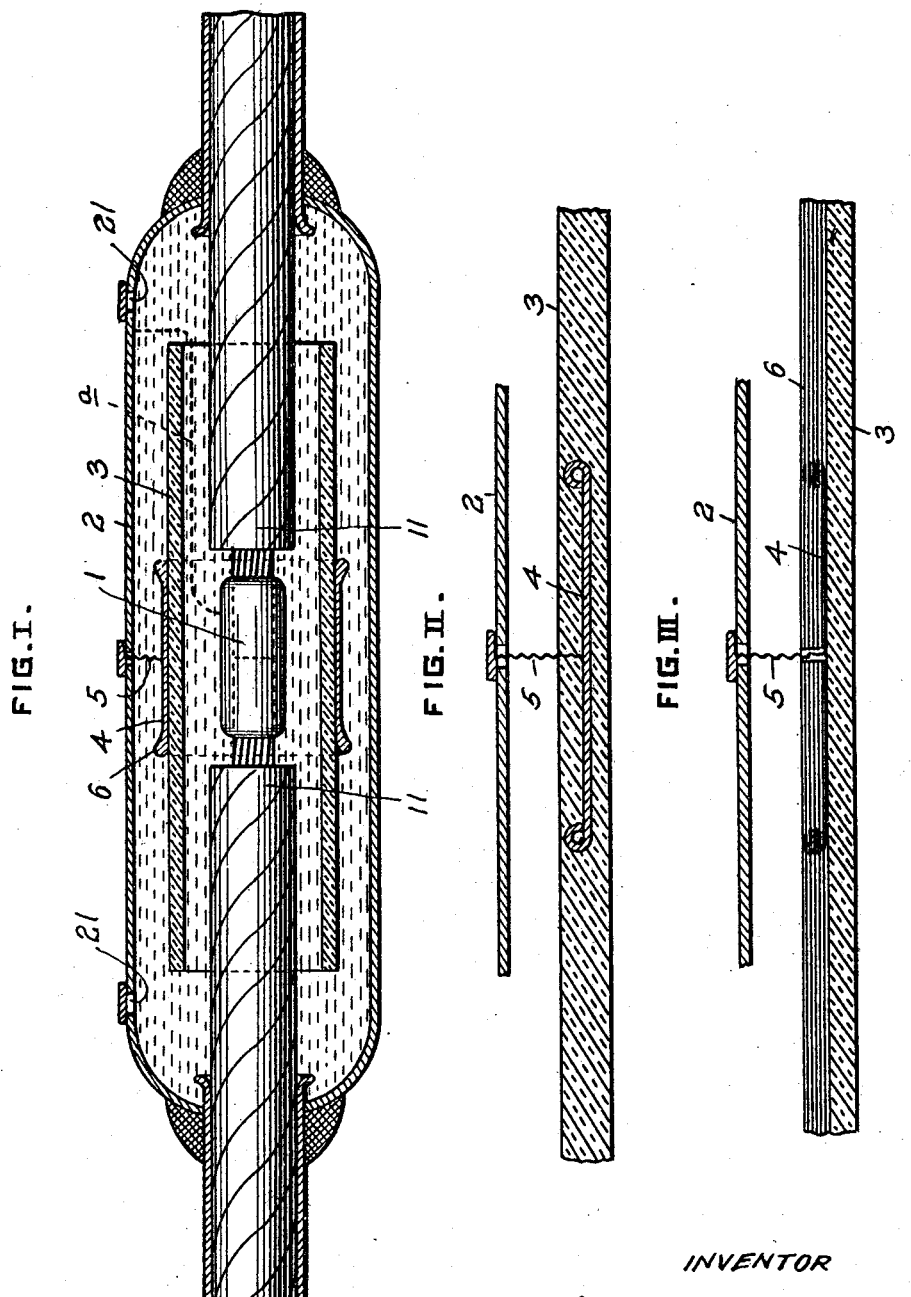
WITNESSES
J. Herbert Bradley.
Percy A. English
INVENTOR
Donald M. Simons
by Christy and Christy
his attorneys

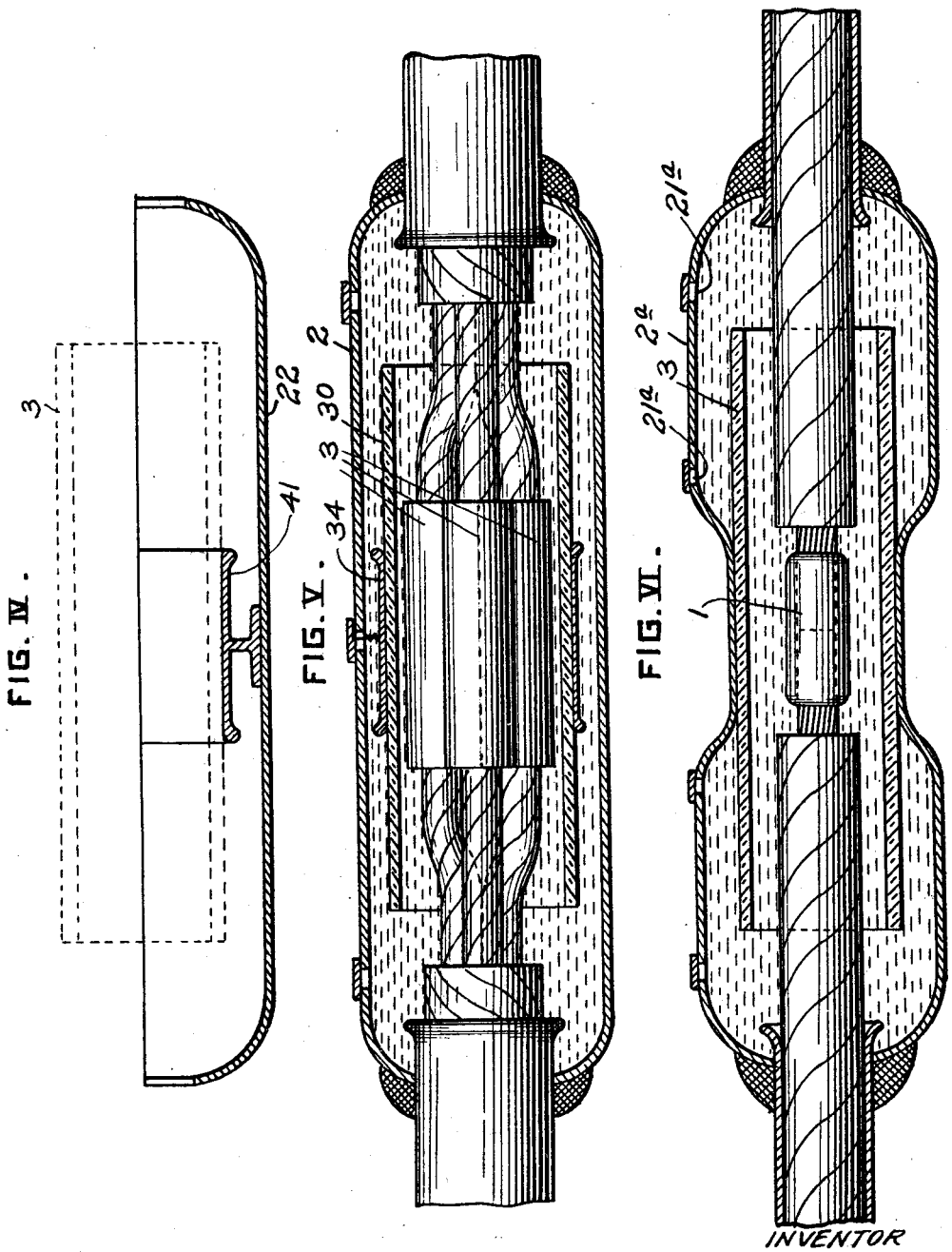

Patented May 10, 1927.

1,628,438

UNITED STATES PATENT OFFICE.

DONALD M. SIMONS, OF OSBORNE, PENNSYLVANIA, ASSIGNOR TO STANDARD UNDERGROUND CABLE COMPANY, OF PITTSBURGH, PENNSYLVANIA, A CORPORATION OF PENNSYLVANIA.

CABLE JOINT.

Application filed January 3, 1925. Serial No. 358.

My invention relates to improvements in joints for electric cables, and consist in a structural provision whereby, other things being equal, the resistance to breakdown stress is increased, and, proportionately, a cable whose joints are built according to my invention is capable of carrying a current of higher voltage.

The invention is illustrated in the accompanying drawings. Fig. I is a view in medial and longitudinal section of the joint of a single-conductor cable, in the structure of which my invention is embodied. Figs. II and III illustrate in section and on the same plane, but to larger scale and diagrammatically, various modifications in the feature in which my invention resides, and in the mode of its application. Fig. IV illustrates in longitudinal and medial section a permissible variation in structure. Fig. V is a view similar to Fig. I, illustrating the invention in its application to a multiple-conductor cable, and Fig. VI is a view similar to Fig. I, and illustrating a further modification.

In Letters Patent of the United States No. 888,674, granted May 26, 1908, on the application of Francis S. Vielé, a cable-joint is shown and described in which a sleeve of solid insulating material surrounds the actual union of the conductors, and bridges the interval at which in the finished joint the cut-away ends of the machine-laid cable insulation stand apart. A casing encloses the whole, and the spaces are filled with insulation, applied in liquid form. Joints of this type or character have been and are widely used, and it is to them that my invention is applicable.

Fig. I shows a joint in which the bared conductors are united by the connector 1, ordinarily a sleeve of copper with rounded edges; sweated with solder to electrical union with the conductor ends. A sleeve of solid insulation 3 surrounds the union, and bridges the interval at which the cut-away ends 11 of the cable insulation stand apart. A joint casing 2 encloses the whole, being at its end united in usual manner to the cable sheath. All of the space within the casing 2 and surrounding the united cable ends is filled with insulation of one sort or another, but for my present purposes it will suffice to remark that the sleeve 3 of solid insulation occupies the position shown and already described, coaxial with the cable ends, and that ultimately, whether there be additional bodies of solid material built into the structure or no, all the space within the casing is flushed and filled with insulating compound, introduced in liquid condition. Filling holes are indicated at 21, which are when the joint is completed, closed with caps soldered to place.

The purpose of the sleeve 3 arranged as illustrated in Fig. I is to prevent direct puncture between the connector 1 and the opposite portion of the joint casing 2. In the present state of the art it is quite possible to obtain tubes of sufficient dielectric strength to constitute a screen and to prevent direct puncture from the connector 1 to casing 2. The weakest point in such a joint (lacking the feature of my invention) is that indicated by the dotted line $a$, from connector 1, around the end of tube 3, to the joint casing 2. In consequence of the presence of this weakest point, the art has not in fact employed sleeves such as 3 of greatest available strength. There has been no object in so doing, for even tubes of less strength afford greater strength to prevent direct punctures than the structure otherwise possesses, to prevent puncture along the devious course around the end of the sleeve, indicated above. The critical point in voltage rise, at which arcing around the end of tube 3 begins, may by lengthening the tube be raised somewhat, and some improvement may be had by increasing the diameter of the joint casing, but neither of these expedients can within the limitations imposed by circumstances afford any very great improvement.

I have found, and herein lies my invention, that if the tube 3 be overlaid over the medial portion of its extent with a sleeve of metal (which covering is grounded), leaving the ends of the sleeve free of such covering, then the tendency to flashing around the end of the tube is reduced and the weak point mentioned above is eliminated from the structure. In Fig. I, I show at 4 such an overlaid sleeve of metal, and I indicate diagrammatically at 5 a wire connecting with the casing 2, by which the metallic sleeve 4 may be grounded.

The presence of this metal sleeve 4 necessarily effects concentration of stress between the connector 1 and the sleeve itself (and in so doing relieves the stresses tending to flashover, around the ends of the sleeve 3), but, as has already been intimated, it is entirely possible to obtain tubes of insulation of sufficient strength to resist such concentrated stress. By this expedient then, the joint is rendered stronger to resist breakdown, and the serviceability of the installation in which my improved joint is employed is increased accordingly.

In order to dissipate the stress which otherwise would be concentrated at the ends of the metallic sleeve 4, tending to cause breakdown of the tube 3 itself, I preferably round, and (if the sleeve be thin, as ordinarily it will be) enlarge its edges, as indicated at 6, Fig. I.

The sleeve 3 may be made of any suitable material, of which there is a variety known to the art, and may be formed by appropriate method. For instance, it may be molded, of such a massive material as bakelite; again, it may be built of spirally wrapped paper, impregnated with a suitable oily or resinous substance, and the metallic overlaid sleeve may be rigid and self-sustaining, or it may be formed of foil, wrapped upon tube 3. In structures intended for high-voltage work, it may be desirable that the sleeve 4, and particularly its edges, be embedded in insulation of high dielectric strength. These considerations lead to the development of various ways of applying the invention. For instance, in Fig. II I show the sleeve of metal 4 molded within the substance of a sleeve 3 of bakelite. In this case, of course, the body 4 of metal is not, literally speaking, an overlay. So much only of the body of the sleeve 3 as lies between the body 4 and the bore of the sleeve 3 is, in this case the effective dielectric, and this, the effective dielectric, the body 4 does (regarding the matter theoretically.) overlie. In my prior Patent No. 1,585,125 granted May 18, 1926, I have described the building of a metal body within a wrapped-on tube of paper insulation. That same idea I may adopt in building a metal sleeve, and particularly a round-ended metal sleeve upon the sleeve 3. This is illustrated in Fig. III, where a sleeve 6 of wrapped-on material is shown, enveloping sleeve 3. The sleeve 3 may or may not be formed of wrapped paper. If it be so formed, the additional wrap 6 may or may not be formed in continuous web with it. The web of which the wrapped-on body 6 is formed, is a web of suitable material, such as paper, and bears a strip of metal foil, so disposed that when the wrap has been made the sleeve 4 is built up. The terminal enlargements (if present) of the sleeve 4 will then be built up of successive strata of foil, and, even though the strata be separated by intervening strata of paper, still the structure will in effect be that of a continuous metal body. These alternative suggestions concerning the formation of the sleeve 4 do not exhaust the ways in which my invention may actually be carried into practice. All that is requisite is a sleeve of conducting material medially overlying the sleeve 3, or the effective part of the body of sleeve 3.

The sleeve 4 may be grounded in any convenient manner. I have already alluded to the showing of Fig. I in this regard: A single wire 5 leads from the sleeve 4. This wire is carried through a hole cut for the purpose in the joint casing 2. The wire is soldered to the casing, and the hole is then capped and the cap is soldered to place. Manifestly, if instead of the wire 5 the sleeve 4 carried a spring of conducting material, and the resilience were effective, to press the spring at its outer end into contact with the inner surface of the sleeve, the desired grounding would be effected.

An alternative arrangement is shown in Fig. IV, where a semi-cylindrical half 22 of a joint casing is shown carrying, electrically united with itself, a half-sleeve 41. When assembly is made of two such halves, upon a union surrounded by an insulating sleeve 3, the essential assembly of Fig. I results.

In the embodiment of the invention particularly shown in Fig. II the grounding wire 5 will advantageously be united with the sleeve 4, before the sleeve is molded within the body 3 of bakelite. In the embodiment shown in Fig. III, provision for grounding the body 4 may be made, either during the wrapping on of the body 6, or subsequently. A grounding lead is diagrammatically indicated in this figure by 5.

In the modification illustrated in Fig. VI, the member 4 of Fig. I, as a separate part, is dispensed with. The joint casing 2ª is itself caused to serve the ends already described, by a reduction in its diameter opposite the middle portion of the extent of tube 3 in the assembly. The diameter of the casing 2ª is so far reduced as to bring about the desired concentration of stress as between connector 1 and such reduced portion of the casing, and therefore relief of stress along the circuitous path already indicated, from the connector 1 around the end of tube 3. Preferably in this reduction of its diameter the casing 2ª is caused to bear immediately upon the sleeve 3 externally. A pair of filling holes 21ª is preferably provided in the casing, on either side of the waist-like reduction described. The assembly of casing 2ª and sleeve 3 will ordinarily be made in the factory, and these two parts so assembled will in the field be applied as a unit. The showing of Fig. IV suggests another arrangement, namely this, that the casing 2ª of Fig. VI may be made as a longitudinally divided, two-part casing. The working out of this suggestion needs no illustration, but will be manifest to the engineer, on comparing Figs. IV and VI. The ends of the casing 2ª will be united with the cut-away ends of the cable sheath in the manner well known to the art.

It will be perceived that, electrically considered, the annulus 4 (41) of Figs. I–IV, grounded as it is to casing 2 (22), is no less a part of the casing than is the waist-like constriction of the casing 2ª, particularly shown in Fig. VI. This common characteristic is defined in general terms in the broader ones of the ensuing claims.

As already I have intimated, the connector 1 may be immediately inclosed in a body of wrapped-on insulation, applied in the field, which wrapped-on body will in turn be enclosed in the tube 3, brought to place around it. And so in other details the insulating material within the casing 2 may be such as is preferred, and as the circumstances indicate and the art recognizes.

Fig. V shows the invention in application to the joint of a multiple-conductor cable. Here each of the three unions is shown to be surrounded by a sleeve 3 of solid insulating material, arranged as already described with reference to Fig. I, and the assembly of three is then surrounded by a larger outer all-surrounding sleeve 30 of like material. Either the inner sleeves 3 or the outer sleeve 30 or both the inner and the outer sleeves may carry upon the outside a sleeve of conducting material, enveloping the sleeve medially of its length, but not extending to the ends. Preferably only the outer sleeve 30 will be so belted, as indicated at 34, and of course this belt 34 will be grounded, in such manner as already described, and may at its edges be provided with a bead-formed and round-surfaced enlargement, all this in the manner and for the purposes already described in connection with the single-conductor structure. If the three inner sleeves 3 of the joint of Fig. V were provided with the metal sleeves of my invention, those metal sleeves would be grounded, by carrying a suitable conductor from each of them, through the outer sleeve 30 (if present) to the joint casing.

In a multiple-conductor structure the inner sleeves 3 may be dispensed with, and the sleeve 30 only retained, or the sleeves 3 may be retained and the sleeve 30 dispensed with. In either case, my invention is applicable to the sleeve retained.

I have throughout shown and spoken of the sleeve 3 (30) as an integral, truly cylindrical sleeve. Various modifications in the shape of this structure are known to the art; as, for instance, sleeves split longitudinally, and so made up of a number of component parts, and sleeves of special shape, formed of interlocking components, and the like. In any case, however, the sleeve retains its essential character of a barrier to electrostatic breakdown. It is formed of solid insulating material, and it entirely surrounds the bared and joined conductor-ends. It will be understood that my invention is applicable and may be enjoyed, wherever such a barrier is found.

I claim as my invention:

1. In a joint for an electric cable the combination of two cable ends with sheath cut away to a greater and insulation cut away to a less distance, and with bared conductor ends electrically united, a sleeve of solid insulating material surrounding the union and spaced at an insulating interval from the union and bridging the gap between the cut away ends of cable insulation, and a casing enclosing the whole, the structure including a grounded annulus of metal surrounding the said sleeve of insulating material throughout the mid-portion of its longitudinal extent, and surrounding such mid-portion at a narrower interval than that at which the casing surrounds the end portions of the said sleeve.

2. In a joint for a multiple-conductor electric cable the combination with the individually connected pairs of conductor ends, a sleeve of solid insulating material spaced at insulating intervals from and surrounding all the unions and bridging all the gaps between the cut away ends of cable insulation, and a casing enclosing the whole, the structure including a grounded annulus of metal surrounding said sleeve of insulating material throughout the mid-portion of its longitudinal extent, and surrounding such mid-portion at a narrower interval than that at which the casing surrounds the end portions of the said sleeve.

3. In a joint structure for an electric cable the combination of two cable ends with sheath and insulation cut away and conductor ends brought into electric union, a sleeve of solid insulating material surrounding the united conductor ends and bridging the interval between the cut-away ends of cable insulation, and a wrapping of a web of insulating material carrying a strip of metal encircling said sleeve and forming thereon an annulus of conducting material extending medially thereon but leaving the ends free of such conducting sleeve, the annulus of conducting material so formed being grounded, and a casing enclosing the whole and at its ends united to the cut-away ends of the cable sheath and spaced at an interval from the ends of said sleeve.

In testimony whereof I have hereunto set my hand.

DONALD M. SIMONS.